April 27, 1954

R. E. BRITTON 2,676,753

COMPRESSOR

Filed May 11, 1953

INVENTOR.
Robert E. Britton,
BY Schroeder, Merriam,
Hofgren & Brady
Attys.

Figures 3, 4:
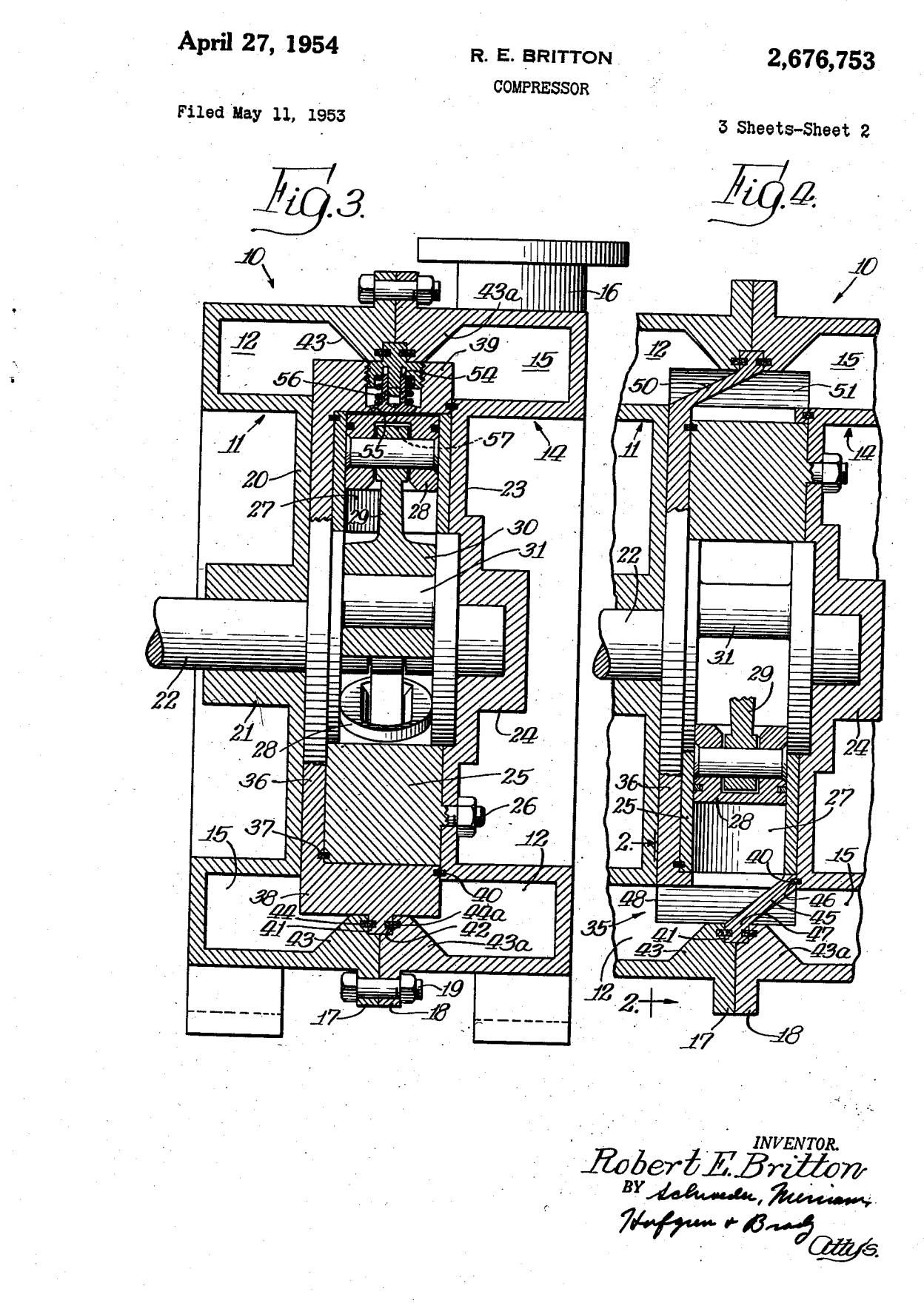

April 27, 1954

R. E. BRITTON 2,676,753

COMPRESSOR

Filed May 11, 1953

INVENTOR.
Robert E. Britton
BY Schmidt, Merriam,
Hofgren & Brady
Attys.

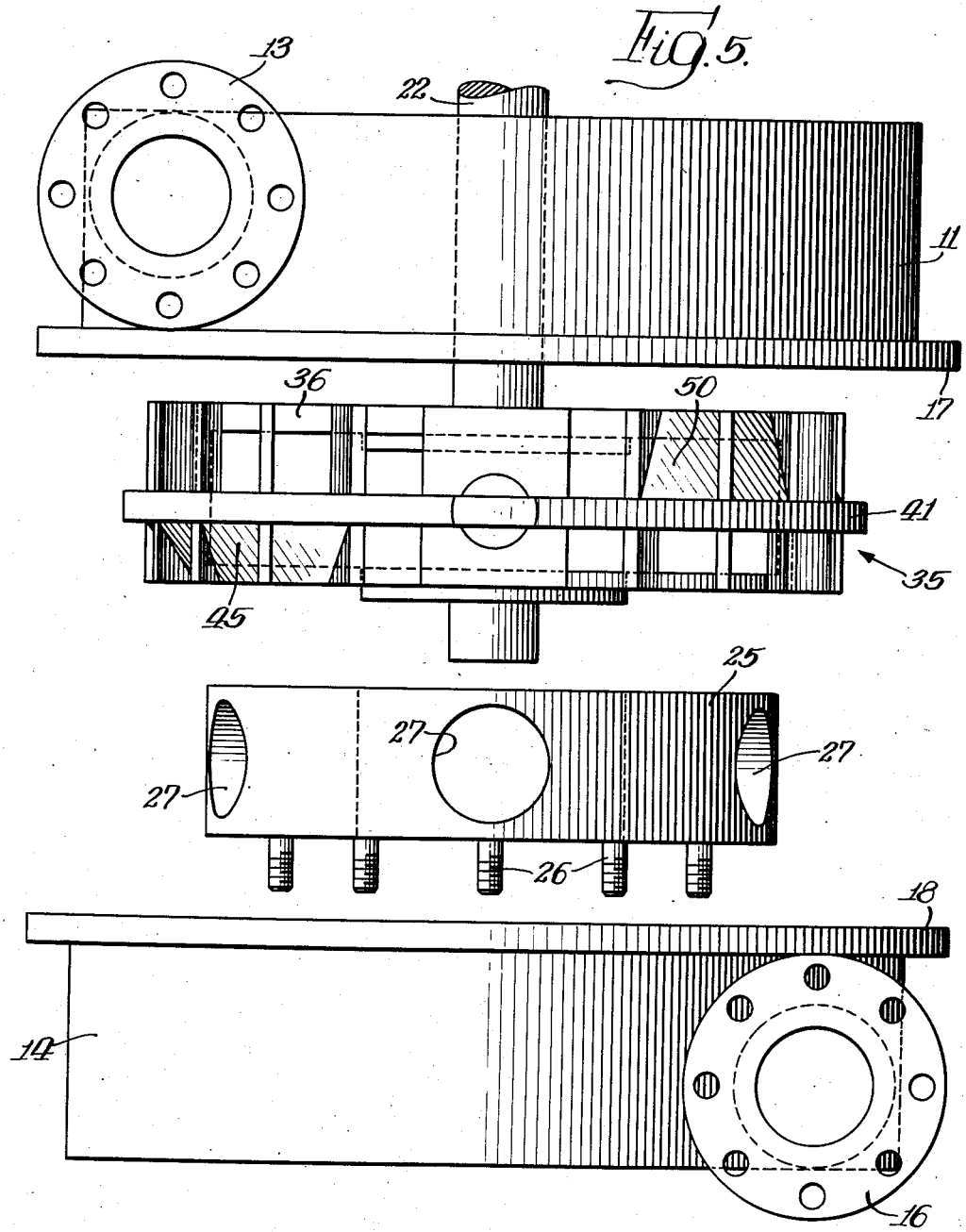

Patented Apr. 27, 1954

2,676,753

UNITED STATES PATENT OFFICE 2,676,753

COMPRESSOR

Robert E. Britton, Holland, Mich., assignor of one-half to Francis G. Filippi

Application May 11, 1953, Serial No. 354,187

12 Claims. (Cl. 230—45)

This invention relates to a fluid actuating device and more particularly to a reciprocating piston fluid actuating device particularly adaptable for use as a compressor.

It is the general object of the invention to produce a new and improved fluid actuating device.

It is a more specific object of the invention to produce a new and improved compressor for gases.

One of the features of the present invention is the provision of a novel valve means for a fluid actuating device of the character described. A more specific feature is the provision of a circular valve mounted for rotation relative to a circular cylinder block containing radial open ended cylinders, with the valve means being provided with two partitions, one of which opens communication between an intake and all of the cylinders whose pistons are on intake stroke and the other of which establishes communication between all of the cylinders whose pistons are on discharge strokes and an outlet.

A further feature of the invention, particularly applicable where the features of the invention are embodied in a gas compressor, is the provision of means for preventing "slugging." As is well known in the field of compressors, "slugging" is a shock effect caused by unevaporated refrigerant or lube oil, or both, being forced through the discharge valves. The shock incident to slugging is responsible for most mechanical difficulties in conventional refrigerator compressors. Of these difficulties valve failure is perhaps the least serious. Ruined bearings, cracked pistons and broken heads are the most common and serious results of slugging.

According to this invention, however, there is produced a compressor for gases which is not susceptible to slugging and thus one which is not susceptible to damage caused by slugging. Thus the apparatus of this invention, when used as a compressor, is so constructed as to include one or more open ended cylinders. Gas to be compressed may enter the cylinders through the open end and the discharge of the cyinder forces the compressed gases again through the open end thereof. The valve means provided opens all or substantially all of the end of the cylinder respectively to the intake and outlet manifolds of the compressor and thus no interference to free flow in and out of the cylinders is presented. By permitting such free flow, dangers of slugging are eliminated and thus the useful life and efficiency of the compressor are increased.

Other features and advantages of the invention will be readily apparent from the following description and drawings, in which:

Fig. 3 is a vertical sectional view taken along line 3—3 of Fig. 1;

Fig. 4 is a view like Fig. 3 taken along line 4—4 of Fig. 1; and

Fig. 5 is an exploded view of the compressor of Fig. 1.

Figures 1, 2:
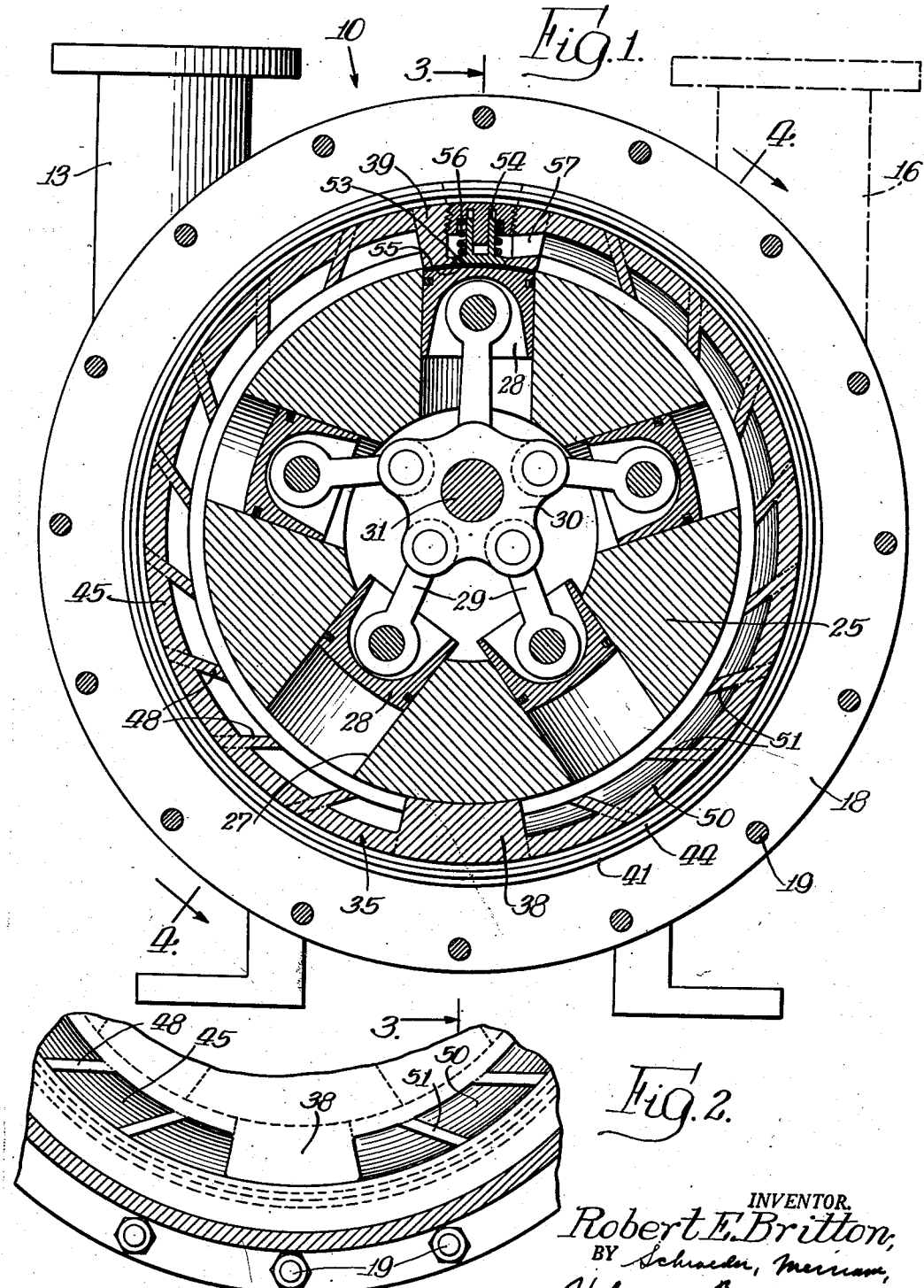
Fig. 1 is a horizontal sectional view taken through apparatus embodying the invention.
Fig. 2 is an enlarged plan view of a portion of the valve means and surrounding housing and block.

While this invention is susceptible of embodiments in many different forms, there is shown in the drawings and will herein be described in detail one specific embodiment, with the understanding that the present disclosure is to be considered as an exemplification of the principles of the invention and is not intended to limit the invention to the embodiment illustrated. The scope of the invention will be pointed out in the appended claims.

Referring now to the drawings, there is shown a compressor having a two-part housing 10, the upper part 11 of which is formed to provide an annular intake manifold 12 connected to an inlet 13 and the lower half 14 of which is shaped to provide an annular outlet manifold 15 connected to a discharge 16. The upper portion 11 is provided with an annular flange 17 substantially equal in size to a flange 18 formed on the portion 14 so that the parts 11 and 14 may be secured together by means of the bolts 19 as shown. Interiorly of the manifold 12 the upper portion 11 is provided with an annular wall 20 terminating at its center in an integral boss portion 21 suitably drilled so as to provide a bearing for a drive shaft 22. Interiorly of the manifold 15 on the lower half 14 there is provided an annular wall 23 terminating at its center in a boss 24 serving as a bearing for the inner end of the drive shaft 22.

The walls 20 and 23 are spaced apart to accommodate therebetween a circular cylinder block 25 fixed to the wall 23 by the bolts 26. Formed within the cylinder block 25 are a plurality of radial cylinders 27, with the cylinders being opened at their outer end as shown in the drawings. A piston 28 is reciprocable in each cylinder and for this purpose is connected by means of connecting rods 29 to a master bearing 30 rotatably mounted on a crank portion 31 of the drive shaft.

As previously noted the cylinders 27 are open ended so as to communicate with the inlet and outlet manifold through the medium of valve means generally designated 35. The valve means comprises a circular plate 36 (Figs. 3 and 4) rotatably mounted between the wall portion 20 and the cylinder block 25 and sealed to the block by an annular gasket 37 preferably of resilient material. The plate 36 carries a pair of diametrically opposite solid portions 38 and 39 preferably integrally formed with the plate 36. Each of the solid portions 38 and 39 sealingly engages the block through the medium of an annular gasket 40 constructed similarly to the gasket 37, with the gasket 40 being on the opposite side of the cylinders as the gasket 37.

Each of the solid portions 38 and 39 is secured to an annular ring 41 rotatably held within a recess 42 formed in complementary portions 43 and 43a in the upper and lower housing portions. The ring 41 is sealed to each of the housing portions by annular gaskets 44 and 44a.

The valve means is so constructed as to establish communication between each of the cylinders 27 and the intake manifold when the pistons therein are on their intake strokes and to establish communication between the cylinders and the outlet manifold when the pistons are on their discharge stroke, with the valve when establishing such communication uncovering all or substantially all of the open end of each cylinder.

For this purpose the valve means 35 is provided with a first partition 45 forming an intake port, with the partition extending between and being connected to the solid portions 38 and 39. The inner edge 46 of the partition is sealed to the block through the medium of the gasket 40 while the outer edge 47 is sealed to the ring 41 preferably by being made integral therewith. The valve means carries a plurality of vanes 48 so inclined as to sweep gases from the intake manifold into the cylinders 27 so as to aid the filling thereof during the intake strokes of the pistons.

The valve means also carries a second partition 50 which forms an outlet port. Like the first partition, the second partition extends between the solid portions but on the opposite side of the valve as the partition 45 and is sealed to the block and ring in the same manner as the first partition. A second plurality of vanes 51 is carried by the second partition 50, with the vanes being so inclined to aid sweeping of gases from the cylinders into the outlet manifold when the pistons are on discharge stroke.

Each of the partitions 45 and 50 extends around approximately 160°, thus making each solid portion approximately 20° in width and the sealing gaskets, be they metallic or a resilient material, are lubricated so as to provide an oil film to effect the positive seal. As relative motion is produced between the valve means and the cylinder block, the clearance therebetween is occupied by an oil film, with the clearance being such that surface tension between the moving member and the film causes the film to move with the member and to provide a seal between intake and discharge gases. The oiling system may operate on the dry sump principle, common in many devices of this nature.

In order to release any material that might become trapped between the solid portion and piston when the piston is at top dead center of its stroke, there is provided a relief valve 53 in the solid portion 39. The relief valve comprises a piston 54 covering an opening 55 in the solid portion and urged to a position closing the opening by a spring 56. On the creation of unusually high pressure between the solid portion 39 and a piston 28, the relief valve may open to permit the escape of highly compressed material into a passage 57 which opens to the space in which the valve means is located.

When operating the device of the invention as a compressor, a source of motive power is connected to the drive shaft 22 to rotate the shaft and hence to reciprocate the pistons 28 in their cylinders. As the plate 36 is connected to the drive shaft the valve means 35 are also rotated, with the arrangement being such that the first partition 45 permits communication between the intake manifold 12 and all of the cylinders whose pistons are moving toward the center of the block, that is which are on intake stroke, while effectively blocking communication between such cylinders and the outlet manifold. Simultaneously the second partition 50 permits communication between all of the cylinders whose pistons are on discharge strokes and the outlet manifold while blocking communication between such cylinders and the intake manifold. As the entire end of each cylinder is uncovered during intake and discharge strokes of the pistons, no slugging can occur. Furthermore, since the intake to each cylinder is not restricted by valve reeds, poppets or disks, re-expansion of compressed gas on the intake stroke of the pistons is substantially zero and thus a high volumetric efficiency is achieved. Furthermore, exit of gases on the discharge strokes of the pistons is unimpeded by restricted passages which also contributes to the high volumetric efficiency of the compressor.

From the foregoing it will be apparent that there has been provided a fluid actuating apparatus particularly adaptable for use as a compressor and when so used is possessed of a high volumetric efficiency while simultaneously eliminating the "slugging" which is apt to be found in compressors of different design.

I claim:

1. Apparatus of the character described comprising a substantially circular cylinder block having a radially arranged open ended cylinder therein, a piston reciprocable in said cylinder, a rotatably mounted circular valve surrounding and sealingly engaging the block, said valve having elongated intake and outlet ports, an intake manifold and an outlet manifold, and means for reciprocating the piston through intake and discharge strokes and for rotating the valve to connect the intake manifold with the cylinder when the piston therein is on its intake stroke and to connect the outlet manifold with the cylinder when the piston therein is on its discharge stroke.

2. Apparatus of the character described comprising a substantially circular cylinder block having a plurality of radially arranged open ended cylinders therein, a piston reciprocable in each cylinder, a rotatably mounted circular valve surrounding the block, opposed annular intake and outlet manifolds positioned on opposite sides of the valve, a first partition carried by the valve to block communication between the outlet manifold and certain of the cylinders, a second partition carried by the valve to block communication between the intake manifold and other of the cylinders, and means for reciprocating the pistons through intake and discharge strokes and for rotating the valve to maintain the first partition in positions to establish communication between the intake manifold and the cylinders whose pistons are on their intake strokes and to maintain the second partition in positions to establish communication between the outlet manifold and the cylinders whose pistons are on their discharge strokes.

3. Apparatus of the character described comprising a substantially circular cylinder block having a plurality of radially arranged open ended cylinders therein, a piston reciprocable in each cylinder, a rotatably mounted circular valve surrounding the block, a pair of diametrically opposed solid portions on the valve each sealingly engaging the block and dimensioned to completely cover the end of a cylinder, opposed annular intake and outlet manifolds positioned on opposite sides of the valve, a first partition carried by the valve and extending around one side of the valve from one of said solid portions to the other solid portion, a second partition carried by the valve and extending around the other side of the valve from one of said solid portions to the other solid portion, said first partition blocking communication between the outlet manifold and all cylinders between the solid portions on said one side of the valve and said second partition blocking communication between the intake manifold and all cylinders between the solid portions on said other side of the valve, and means for reciprocating the pistons through intake and discharge strokes and for rotating the valve to maintain the first partition in positions to establish communication between the intake manifold and the cylinders whose pistons are on their intake strokes, to maintain the second partition in positions to establish communication between the outlet manifold and the cylinders whose pistons are on their discharge strokes and to maintain said solid portions in positions to cover the cylinders whose pistons are on substantially dead center.

4. Apparatus of the character described comprising a substantially circular cylinder block having a plurality of radially arranged open ended cylinders therein, a piston reciprocable in each cylinder, a rotatably mounted circular valve surrounding the block, a pair of diametrically opposed solid portions on the valve each sealingly engaging the block and dimensioned to completely cover the end of a cylinder, a pressure responsive relief valve in one of said portions, opposed annular intake and outlet manifolds positioned on opposite sides of the valve, a first partition carried by the valve and extending around one side of the valve from one of said solid portions to the other solid portion, a second partition carried by the valve and extending around the other side of the valve from one of said solid portions to the other solid portion, said first partition blocking communication between the outlet manifold and all cylinders between the solid portions on said one side of the valve and said second partition blocking communication between the intake manifold and all cylinders between the solid portions on said other side of the valve, and means for reciprocating the pistons through intake and discharge strokes and for rotating the valve to maintain the first partition in positions to establish communication between the intake manifold and the cylinders whose pistons are on their intake strokes, to maintain the second partition in positions to establish communication between the outlet manifold and the cylinders whose pistons are on their discharge strokes and to maintain said solid portions in positions to cover the cylinders whose pistons are on substantially dead center with the solid portion carrying the pressure relief valve covering the cylinder whose piston is on dead center of its discharge stroke.

5. Apparatus of the character described comprising a substantially circular cylinder block having a plurality of radially arranged open ended cylinders therein, a piston reciprocable in each cylinder, a rotatably mounted circular valve surrounding the block, a pair of diametrically opposed solid portions on the valve each sealingly engaging the block and dimensioned to completely cover the end of a cylinder, opposed annular intake and outlet manifolds positioned on opposite sides of the valve, a first partition carried by the valve and extending around one side of the valve from one of said solid portions to the other solid portion, a second partition carried by the valve and extending around the other side of the valve from one of said solid portions to the other solid portion, said first partition blocking communication between the outlet manifold and all cylinders between the solid portions on said one side of the valve and said second partition blocking communication between the intake manifold and all cylinders between the solid portions on said other side of the valve, a drive shaft having a crank portion connected to the pistons for reciprocating the same through intake and discharge strokes, means connecting the shaft to the valve for rotating the valve to maintain the first partition in positions to establish communication between the intake manifold and the cylinders whose pistons are on their intake strokes, to maintain the second partition in positions to establish communication between the outlet manifold and the cylinders whose pistons are on their discharge strokes and to maintain said solid portions in positions to cover the cylinders whose pistons are on substantially dead center.

6. Apparatus of the character described comprising a substantially circular cylinder block having a plurality of radially arranged open ended cylinders therein, a piston reciprocable in each cylinder, a rotatably mounted circular valve surrounding the block, a pair of diametrically opposed solid portions on the valve each sealingly engaging the block and dimensioned to completely cover the end of a cylinder, opposed annular intake and outlet manifolds positioned on opposite sides of the valve, a first partition carried by the valve and extending around one side of the valve from one of said solid portions to the other solid portion, a second partition carried by the valve and extending around the other side of the valve from one of said solid portions to the other solid portion, said first partition blocking communication between the outlet manifold and all cylinders between the solid portions on said one side of the valve and said second partition blocking communication between the intake manifold and all cylinders between the solid portions on said other side of the valve, a first plurality of vanes on the valve and associated with the first partition, said vanes being inclined to sweep fluid from the intake manifold into the cylinders, a second plurality of vanes on the valve and associated wiith the second partition with the last mentioned vanes being inclined to sweep fluid from the cylinders into the outlet manifold, a drive shaft having a crank portion connected to the pistons for reciprocating the same through intake and discharge strokes, and means connecting the shaft to the valve for rotating the valve to maintain the first partition in positions to establish communication between the intake manifold and the cylinders whose pistons are on their intake strokes, to maintain the second partition in positions to establish communication between the outlet manifold and the cylinders whose pistons are on their discharge strokes and to maintain said solid portions in positions to cover the cylinders whose pistons are on substantially dead center.

7. A gas compressor comprising a housing, a substantially circular cylinder block stationarily mounted in the housing and having a plurality of radially arranged open ended cylinders therein, a piston reciprocable in each cylinder, a circular valve rotatably mounted in the housing and surrounding the block, a pair of diametrically opposed solid portions on the valve each sealingly engaging the block and dimensioned to completely cover the end of a cylinder, opposed annular intake and outlet manifolds in the housing and each having a portion equal in diameter to the diameter of the valve, a first partition carried by the valve and extending approximately 160° around one side of the block from one of said solid portions to the other solid portion, a second partition carried by the valve and extending approximately 160° around the other side of the block from one solid portion to the other solid portion, said first partition having its inner edge adjacent the side of the block adjacent the outlet manifold to block communication between said outlet manifold and all cylinders on said one side of the valve while opening the entire end of such cylinders to the intake manifold and said second partition having its inner edge adjacent the side of the block adjacent the intake manifold to block communication between said intake manifold and all cylinders on said other side of the valve while opening the entire end of such cylinders to the outlet manifold, a first plurality of vanes on the valve and spaced along the first partition, said vanes being inclined to sweep gas from the intake manifold into the cylinders, a second plurality of vanes on the valve and spaced along the second partition, said second plurality of vanes being inclined to sweep gas from the cylinders into the outlet manifold, a drive shaft having a crank portion connected to the pistons for reciprocating the same through intake and discharge strokes, and a circular plate rotatably mounted in the housing, said plate being fixed to the drive shaft and connected to said solid portions and said inner edge of the second partition for rotating the valve to maintain the first partition in positions to establish communication between the intake manifold and the cylinders whose pistons are on their intake strokes, to maintain the second partition in positions to establish communication between the outlet manifold and the cylinders whose pistons are on their discharge strokes and to maintain said solid portions in positions to cover the cylinders whose pistons are on substantially dead center.

8. A gas compressor comprising a housing, a substantially circular cylinder block stationarily mounted in the housing and having a plurality of radially arranged open ended cylinders therein, a piston reciprocable in each cylinder, a ring surrounding the block in spaced relation thereto and rotatably and sealingly mounted in the housing, a circular valve carried by the ring, a pair of diametrically opposed solid portions on the valve each sealingly engaging the block and dimensioned to completely cover the end of a cylinder, a pressure responsive relief valve in one of said solid portions, opposed annular intake and outlet manifolds in the housing and each having a portion equal in diameter to the diameter of the valve, a first partition on the valve and extending approximately 160° around one side of the block from one of said solid portions to the other solid portion, said first partition having its outer edge secured to the ring and its inner edge adjacent the side of the block adjacent the outlet manifold to block communication between said outlet manifold and all cylinders on said one side of the valve while opening the entire end of such cylinders to the intake manifold, a second partition on the valve and extending approximately 160° around the other side of the block from one of said solid portions to the other solid portion, said second partition having its outer edge secured to the ring and its inner edge adjacent the side of the block adjacent the intake manifold to block communication between said intake manifold and all cylinders on said other side of the valve while opening the entire end of such cylinders to the outlet manifold, a first plurality of vanes on the valve and spaced along the first partition, said vanes being inclined to sweep gas from the intake manifold into the cylinders, a second plurality of vanes on the valve and spaced along the second partition, said second plurality of vanes being inclined to sweep gas from the cylinders into the outlet manifold, a drive shaft having a crank portion connected to the pistons for reciprocating the same through intake and discharge strokes, and a circular plate rotatably mounted in the housing, said plate being fixed to the drive shaft and connected to said solid portions and said inner edge of the second partition for rotating the valve to maintain the first partition in positions to establish communication between the intake manifold and the cylinders whose pistons are on their intake strokes, to maintain the second partition in positions to establish communication between the outlet manifold and the cylinders whose pistons are on their discharge strokes and to maintain said solid portions in positions to cover the cylinders whose pistons are on substantially dead center with the solid portion carrying the relief valve covering the cylinder whose piston is on dead center of its discharge stroke.

9. Apparatus of the character described comprising a substantially circular cylinder block having a plurality of radially arranged open ended cylinders therein, a piston reciprocable in each cylinder, a rotatably mounted circular valve surrounding and sealingly engaging the block, means on the valve forming an intake and an outlet port with each port extending a substantial distance around the block and completely uncovering the open ends of the cylinders, an intake manifold and an outlet manifold, and means for reciprocating the pistons through intake and discharge strokes and for rotating the valve to connect the intake manifold with the cylinders when the pistons therein are on their intake stroke and to connect the outlet manifold with the cylinders when the pistons therein are on their discharge strokes.

10. Apparatus of the character described comprising a substantially circular cylinder block having a plurality of radially arranged open ended cylinders therein, a piston reciprocable in each cylinder, a circular valve surrounding and sealingly engaging the block, means on the valve forming an intake and an outlet port with each port extending a substantial distance around the block and completely uncovering the open ends of the cylinders, an intake manifold and an outlet manifold, and means for reciprocating the pistons through intake and discharge strokes and for causing relative rotation between the cylinder block and the valve to connect the intake manifold with the cylinders when the pistons therein are on their intake stroke and to connect the outlet manifold with the cylinders when the pistons therein are on their discharge strokes.

11. A gas compressor comprising a housing, a substantially circular cylinder block stationarily mounted in the housing and having a plurality of radially arranged open ended cylinders therein, a piston reciprocable in each cylinder, a ring surrounding the block in spaced relation thereto and rotatably and sealingly mounted in the housing, a circular valve carried by the ring, an intake and an outlet manifold in the housing, a first partition on the valve and extending approximately 160° around one side of the block, a second partition on the valve and extending approximately 160° around the other side of the block, with the outer edges of each partition being secured to the ring and the inner edge of the first partition sealingly engaging the block on one side of the cylinders and the edge of the second partition sealingly engaging the block on the opposite side of the cylinders, and means for reciprocating the pistons through intake and discharge strokes and for rotating the valve to connect the intake manifold with the cylinders when the pistons therein are on their intake stroke and to connect the outlet manifold with the cylinders when the pistons therein are on their discharge strokes.

12. A gas compressor comprising a housing, a substantially circular cylinder block stationarily mounted in the housing and having a plurality of radially arranged open ended cylinders therein, a piston reciprocable in each cylinder, a ring surrounding the block in spaced relation thereto and rotatably and sealingly mounted in the housing, a circular valve carried by the ring, an intake and an outlet manifold in the housing, a first partition on the valve and extending approximately 160° around one side of the block, a second partition on the valve and extending approximately 160° around the other side of the block, with the outer edges of each partition being secured to the ring and the inner edge of the first partition sealingly engaging the block on one side of the cylinders and the edge of the second partition sealingly engaging the block on the opposite side of the cylinders, a first plurality of vanes on the valve and spaced along the first partition, said vanes being inclined to sweep gas from the intake manifold into the cylinders, a second plurality of vanes on the valve and spaced along the second partition, said second plurality of vanes being inclined to sweep gas from the cylinders into the outlet manifold, and means for reciprocating the pistons through intake and discharge strokes and for rotating the valve to connect the intake manifold with the cylinders when the pistons therein are on their intake stroke and to connect the outlet manifold with the cylinders when the pistons therein are on their discharge strokes.

References Cited in the file of this patent

UNITED STATES PATENTS

| Number | Name | Date |
|---|---|---|
| 1,182,507 | Rix | May 9, 1916 |
| 1,320,792 | Noguera | Nov. 4, 1919 |
| 1,466,230 | Johnson | Aug. 28, 1923 |
| 1,565,640 | Green | Dec. 15, 1925 |
| 2,127,550 | Cocanour | Aug. 23, 1938 |
| 2,479,876 | Sherman | Aug. 23, 1949 |